A. J. LEWIS.
METHOD OF ASSEMBLING SPRINGS IN FASTENER MEMBERS.
APPLICATION FILED MAY 31, 1919.
1,357,174.
Patented Oct. 26, 1920.
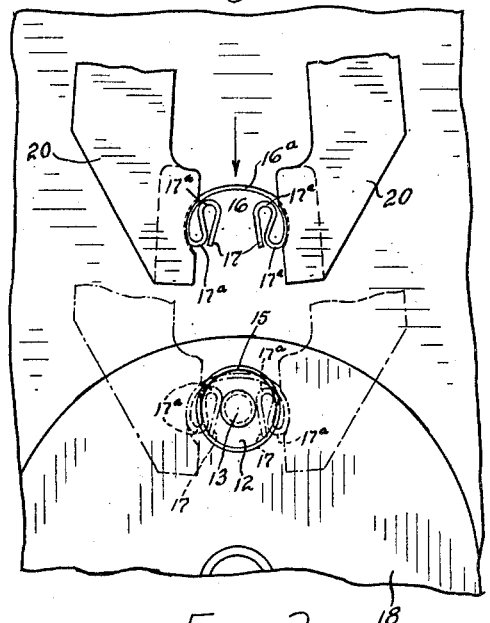
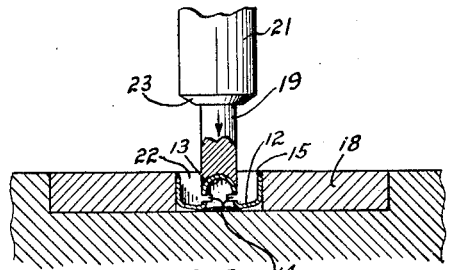
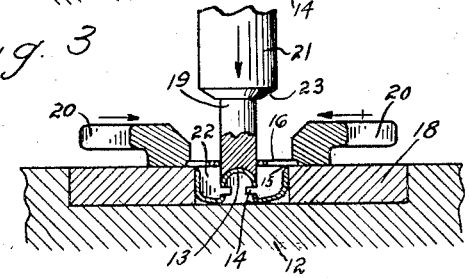
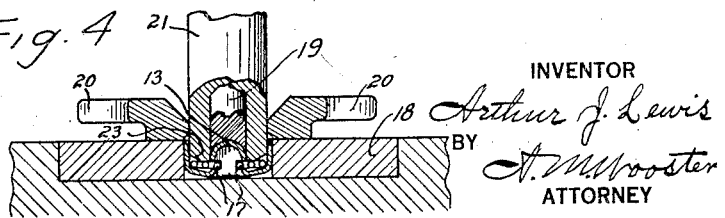
INVENTOR
Arthur J. Lewis
BY
ATTORNEY

UNITED STATES PATENT OFFICE.

ARTHUR J. LEWIS, OF STRATFORD, CONNECTICUT.

METHOD OF ASSEMBLING SPRINGS IN FASTENER MEMBERS.

1,357,174.  Specification of Letters Patent.  Patented Oct. 26, 1920.

Application filed May 31, 1919. Serial No. 301,013.

*To all whom it may concern:*

Be it known that I, ARTHUR J. LEWIS, a citizen of the United States, residing at Stratford, county of Fairfield, State of Connecticut, have invented an Improvement in Methods of Assembling Springs in Fastener Members, of which the following is a specification.

This invention relates to the manufacture of the socket members of snap fasteners, so called, the socket members of which are provided with wire springs of peculiar formation which lock the shanks of the other fastener members in engagement with the said socket members.

In Letters Patent No. 1,305,132, granted to me May 27, 1919, is disclosed an improved method of forming the wire springs employed in snap fastener socket members of the type above referred to and for inserting said springs into said socket members, and the present invention relates particularly to improvements in the latter step of the process, namely, that of assembling the springs in the fastener members, the same being in the nature of a modification of the process described in my copending application filed May 31, 1919, Serial No. 301,012.

The more particular objects of the invention will best be understood from the following explanation of one mode of carrying the same into effect, reference being had to the accompanying drawings in which:

Figure 1 is a diagrammatic plan view, and Figs. 2, 3, and 4 are sectional views illustrating different steps in the process of inserting a spring into a fastener member.

Fig. 5 is an enlarged plan view of the complete fastener member.

While the method constituting the present invention may be employed in inserting springs into other small spring receiving articles, the same has more particular reference to the introduction of the springs into snap fastener socket members of the type shown in Fig. 5. A socket member of the type referred to comprises a sheet metal disk 12 having a central hollow stud 13 constituting the socket proper and provided with diametrically opposite slots 14, said disk having an upwardly turned peripheral edge portion or flange 15 inclosing a wire spring 16, it being understood that, after the insertion of said spring, the edge 15 may be bent downwardly thereover to retain the same in place. The spring 16 is of roughly semi-circular form having an outer coil $16^a$ engaging the edge 15 of the fastener member, the ends of said coil being bent inwardly and outwardly upon themselves, to form a series of convolutions $17^a$, and the free terminals 17 thereof being, in the completed fastener, received in the slots 14 of the central stud 13.

Preferably, and as disclosed and claimed in my copending application filed May 31, 1919, Serial No. 301,011, the springs 16 are initially formed with their outer coils $16^a$ somewhat flatter than the form assumed when the spring is in its final position in the fastener member, the spring as a whole being consequently of a slightly elliptical form with a major diameter somewhat exceeding the diameter of the fastener member into which it is to be inserted, as will be clear from a comparison of Figs. 1 and 5, so that the expanded spring must be compressed slightly when the same is inserted into the fastener (such compression, however, being insufficient to exceed the elastic limit of the spring), such spring being thereafter retained in the device under a permanent resilient compression, which not only serves to resist accidental dislodgment of the spring from the fastener member, but increases the effective strength of the terminals 17, causing them to perform their intended function with increased reliability.

It will be observed that in order to insert a spring of the form shown into a socket member of the character under consideration, it is necessary to compress the terminals 17 outwardly in order to permit the same to pass over the central stud 13 and snap into place in the slots 14. It therefore follows that said terminals 17, as also the several convolutions $17^a$, must, during the insertion of the spring, pass through the somewhat restricted annular space 22 between the central stud 13 and the peripheral edge 15. It will also be noted that, when the spring is inserted, the outer coil thereof must be confined within the periphery of the socket member, and where an oversize spring is employed the outer coil thereof must be compressed inwardly to within the compass of the socket member. If the inward compression of the outer coil of the spring and the outward compression of the terminals 17 thereof take place simultaneously, and the entire spring is crowded at once into the restricted annular space 22, it will be seen that the convolutions 17ª will be subjected to a considerable strain which may be so excessive as to result in a permanent set, materially impairing the efficiency of the device. In order to avoid this difficulty, and as disclosed and more broadly claimed in my copending application filed May 31, 1919, Serial No. 301,011, the spring as a whole is not forced into the socket member all at once, but the terminals 17 are referably first inserted into the fastener member about the stud 13, the outer coil 16ª being at this time fully expanded or under only slight compression, and thereafter the outer coil is compressed and forced into place in engagement with the peripheral edge 15 of the fastener, the terminals 17 being at this time free to expand downwardly into the fastener and laterally into the slots 14. In this manner it will be seen that the insertion of the several parts of the spring may be caused to take place successively instead of simultaneously, thereby avoiding excessive strain upon the spring.

In accordance with the present invention, the foregoing operations are performed as follows.

The fastener member 12 into which a spring is to be inserted is held in any suitable work-holding device (as, for example, a bed or carrier plate 18 having a recess to receive said fastener), and a suitable mandrel 19 of substantially the same diameter as the central stud 13, and preferably provided with a recessed end to fit the head of said stud, is placed thereover as shown in Fig. 2. A spring 16 in expanded condition is held between a pair of suitably formed plier or other jaws 20 (which jaws may be either mechanically or manually operated), as shown in full lines in Fig. 1, with its open side foremost or directed toward the socket member 12, and said jaws moved in the direction of the arrow on Fig. 1 to bring said spring immediately over said socket member, as shown in dotted lines in said figure, the spring terminals 17, during this movement, passing on opposite sides of the mandrel 19. Thereupon the jaws 20 may be moved toward one another, as indicated by the arrows on Fig. 3, to compress the outer coil 16ª of the spring 16 about the mandrel 19 into a sufficiently small compass to be received within the flanges 15 of the socket member. Also, by the use of a suitable implement inserted between the jaws 20 and mandrel 19, the spring may be forced downwardly into the socket member in such a manner that the terminals 17 thereof will pass from the mandrel 19 over the central stud 13, eventually snapping into the slots 14 of the latter, and, after the complete or partial insertion of the terminals 17, the outer coil 16ª will seat itself within the peripheral edge 15.

The operations last referred to may be conveniently performed by means of an annular tool or plunger 21 of an interior diameter corresponding approximately to the exterior diameter of the mandrel 19 and an exterior diameter approximately equal to the inside diameter of the edge 15, said tool being movable downwardly over the mandrel 19, as indicated by the arrow on Fig. 3, and between the jaws 20, to force the spring 16 downwardly from said jaws and into the socket member, as shown in Fig. 4, without permitting expansion of said spring until it is substantially in place. The plunger 21 may be formed with a beveled lower edge 23, so that, when said plunger is depressed, the central portion thereof will force the terminals 17 from the mandrel 19 and into position about the stud 13 and eventually opposite the slots 14. During the latter portion of this operation, the jaws 20 are brought together to contract or compress the outer coil of the spring to within the compass of the fastener member, the terminals 17 at this time expanding freely into the slots 14, the outer portion of the plunger 21 finally forcing the outer coil of the spring to its seat in the socket member.

The downward movement of the plunger 21 and the inward movement of the jaws 20 preferably take place simultaneously, as indicated by the arrows on Fig. 3, but these movements are so timed that the inner portion of the spring is engaged and forced downwardly by the inner portion of the plunger 21 before the outer coil thereof is fully compressed by the jaws 20 and engaged by the outer portion of said plunger.

Having thus described my invention, I claim:

1. The herein described method of inserting springs into spring receiving articles, which consists in placing a mandrel in contact with an article to receive a spring, moving a spring into a position adjacent said mandrel, compressing said spring about said mandrel, and forcing said spring from said mandrel into said article.

2. The herein described method of inserting springs having open and closed sides into spring receiving articles, which consists in placing a mandrel in contact with an article to receive a spring, moving a spring open side foremost into engagement with said mandrel, compressing said spring about said mandrel, and forcing said spring from said mandrel into said article.

3. The herein described method of applying springs having outer coils and free inner terminals to spring receiving articles having outer edge portions coöperating with the outer coils of said springs and central studs coöperating with the inner terminals of said springs, which consists in placing a mandrel in engagement with the central stud of an article to receive a spring, moving a spring into a position with its terminals at opposite sides of said mandrel, compressing the outer coil of said spring about said mandrel, and forcing said spring from said mandrel into said article.

4. The herein described method of inserting springs into spring receiving articles, which consists in providing a spring of an initially greater dimension than the corresponding dimension of the article to receive it, placing a mandrel in contact with said article, moving said spring into a position adjacent said mandrel, compressing said spring about said mandrel to within the compass of said article, and forcing said spring while still under compression from said mandrel into said article.

5. The herein described method of inserting springs having inner and outer portions into spring receiving articles, which consists in placing a mandrel in contact with an article to receive a spring, moving a spring into a position with its inner portion adjacent said mandrel, compressing said spring about said mandrel and forcing the inner portion thereof from said mandrel into said article, and thereafter forcing the outer portion of said spring into said article.

6. The herein described method of inserting springs having inner and outer portions into spring receiving articles, which consists in providing a spring of an initially greater dimension than the corresponding dimension of the article to receive it, placing a mandrel in contact with said article, moving said spring into a position with its inner portion adjacent said mandrel, forcing the inner portion of said spring from said mandrel into said article and compressing the outer portion thereof to within the compass of said article, and thereafter forcing said outer portion into said article.

7. The herein described method of applying springs having outer coils and free inner terminals to spring receiving articles having outer edge portions coöperating with the outer coils of said springs and central studs having slots to receive the inner terminals of said springs, which consists in providing a spring having an outer coil of initially greater diameter than the diameter of the article to receive it, placing a mandrel in engagement with the central stud of said article, moving said spring into a position with its terminals at opposite sides of said mandrel, forcing the inner terminals of said spring from said mandrel into positions to enter said slots and compressing the outer coil of said spring to a diameter substantially corresponding to the diameter of said article, and thereafter forcing said outer coil into said article.

8. The herein described method of inserting springs into spring receiving articles having central studs, which consists in applying a mandrel to the central stud of an article, moving a spring into a position about said mandrel, and forcing said spring over said mandrel into said article and about said stud.

In testimony whereof I affix my signature.

ARTHUR J. LEWIS.